United States Patent

Nakamura et al.

[11] Patent Number: 5,877,256
[45] Date of Patent: Mar. 2, 1999

[54] LIQUID SILICONE RUBBER COATING COMPOSITION FOR APPLICATION TO AIR BAGS

[75] Inventors: Akito Nakamura; Yuichi Tsuji, both of Chiba Prefecture, Japan

[73] Assignee: Dow Corning Toray Silicone Co., Ltd., Tokyo, Japan

[21] Appl. No.: 7,466

[22] Filed: Jan. 22, 1993

[30] Foreign Application Priority Data

Jan. 31, 1992 [JP] Japan ................................ 4-046045

[51] Int. Cl.$^6$ ....................................... C08K 5/05
[52] U.S. Cl. .................. 524/765; 524/730; 524/731; 524/847; 524/862; 524/720
[58] Field of Search .................... 524/847, 858, 524/862, 765, 730, 731, 720; 280/728 R, 743 R

[56] References Cited

U.S. PATENT DOCUMENTS

| 4,087,585 | 5/1978 | Schulz | 428/429 |
| 4,472,470 | 9/1984 | Modic | 428/145 |
| 5,082,894 | 1/1992 | VanWert et al. | 524/730 |

FOREIGN PATENT DOCUMENTS 243442  3/1991  Japan .

OTHER PUBLICATIONS

Abstract; Derwent Publications, Inc. Class A, AN 92–093888 & JP–A–4 039 036. 10 Feb. 1992.
Japanese Abstract JP 8878744.

*Primary Examiner*—Melvyn I. Marquis
*Attorney, Agent, or Firm*—Sharon K. Severance

[57] ABSTRACT

The instant invention pertains to a liquid silicone rubber coating composition for application to air bags that is comprised of (A) a diorganopolysiloxane having at least 2 alkenyl groups in each molecule, (B) an organopolysiloxane resin, (C) an inorganic filler, (D) an organohydrogenpolysiloxane having at least 2 silicon-bonded hydrogen atoms in each molecule, (E) a platinum group metal catalyst, and (F) an epoxy group-containing organosilicon compound. The liquid silicone rubber coating composition of the instant invention is capable of coating synthetic air bag fabrics without the use of a diluting solvent and at the same time that has an excellent adhesion to and infiltrability into synthetic air bag fabrics.

9 Claims, No Drawings

5,877,256

LIQUID SILICONE RUBBER COATING COMPOSITION FOR APPLICATION TO AIR BAGS

BACKGROUND OF THE INVENTION

Air bags have recently entered into widespread practical application as occupant protection safety devices in automobiles. Air bags are typically fabricated from a base fabric of chloroprene rubber-coated nylon fabric. However, with chloroprene rubber-coated base fabrics it is difficult to reduce the weight and the properties deteriorate with the passage of long periods of time. Air bag base fabrics coated with silicone rubber compositions have also been proposed very recently For example Japanese Patent Application Laid Open Kokai Numbers Sho 63-78744 [78,744/1988] and Hei 3-243442 [243,442/1991] disclose air bags coated with silicone rubber compositions. These silicone rubber composition-coated air bag base fabrics have excellent high-temperature properties. However, in order to obtain a uniform, thin film and a satisfactory bonding strength to the base fabric, a diluting organic solvent must be used in the application of these silicone rubber compositions to the synthetic fiber fabrics used for air bags, for example nylon 66. That is, in order to secure infiltration into the base fabric and thin-film coatability, these silicone rubber compositions must be diluted with an organic solvent such as toluene, xylene, and others.

It is an object of the instant invention to show a liquid silicone rubber coating composition for application to air bags that can be coated on the synthetic fiber fabrics used for air bags without the use of diluting solvent. The silicone rubber composition of the instant invention contains specific organosilicon compounds that exhibit excellent infiltrability and thin-film coatability as well as a strong adherence for the synthetic fabrics used for air bags.

SUMMARY OF THE INVENTION

The instant invention relates to a liquid silicone rubber coating composition for application to air bags in automobiles and so forth that is comprised of (A) a diorganopolysiloxane having at least 2 alkenyl groups in each molecule, (B) an organopolysiloxane resin, (C) an inorganic filler, (D) an organohydrogenpolysiloxane having at least 2 silicon-bonded hydrogen atoms in each molecule, (E) a platinum group metal catalyst and (F) an epoxy group-containing organosilicon compound. Specifically, the instant invention relates to a liquid silicone rubber coating composition that is highly coatable into thin films without the use of solvent and that is resistant to the shock accompanying expansion/inflation and particularly high-temperature expansion.

THE INVENTION

The instant invention pertains to a liquid silicone rubber coating composition for application to air bags that is comprised of (A) a diorganopolysiloxane having at least 2 alkenyl groups in each molecule, (B) 5 to 80 weight parts per 100 weight parts of (A) of an organopolysiloxane resin, (C) 5 to 100 weight parts per 100 weight parts of (A) of an inorganic filler, (D) an organohydrogenpolysiloxane having at least 2 silicon-bonded hydrogen atoms in each molecule, in a quantity sufficient for the ratio between the number of moles of silicon-bonded hydrogen atoms in this component and the number of moles of alkenyl groups in component (A) to have a value of 0.6:1 to 20:1, (E) a platinum group metal catalyst in a quantity providing 0.1 to 500 weight parts as platinum group metal per 1,000,000 weight parts component (A), and (F) 0.1 to 20 weight parts per 100 weight parts of (A) of an epoxy group-containing organosilicon compound.

The diorganopolysiloxane, component (A), used in the instant invention is the base component of the composition of the instant invention. This diorganopolysiloxane must contain at least 2 alkenyl groups in each molecule in order for the composition of the instant invention to cure into a rubbery elastic silicone rubber coating membrane.

The diorganopolysiloxane (A) comprises essentially straight-chain organopolysiloxane with the average unit formula $$R_nSiO_{(4-n)/2}$$

wherein R is selected from substituted and unsubstituted monovalent hydrocarbon groups and n has a value of 1.9 to 2.1. R may be exemplified by alkyl groups such as methyl, ethyl, propyl, and others; alkenyl groups such as vinyl, allyl, and others; aryl groups such as phenyl, and others; and haloalkyl groups such as 3,3,3-trifluoropropyl and others. The diorganopolysiloxane (A) should have a viscosity at 25° C. of at least 100 centipoise. When such factors as the strength of the silicone rubber coating membrane, and blendability are taken into account, the viscosity of diorganopolysiloxane (A) at 25° C. is preferably from 1,000 centipoise to 100,000 centipoise. The diorganopolysiloxane (A) may be exemplified dimethylvinylsiloxy-endblocked dimethylpolysiloxanes, dimethylvinylsiloxy-endblocked dimethylsiloxane-methylvinylsiloxane copolymers, and dimethylvinylsiloxy-endblocked dimethylsiloxane-methylphenylsiloxane copolymers.

The organopolysiloxane resin, component (B), functions to increase the mechanical strength of the silicone rubber coating membrane and in particular to increase the infiltrability and adherence of the instant invention's silicone rubber coating composition for synthetic air bag fabrics. The organopolysiloxane resin (B) may be exemplified by resins comprised of the $(CH_3)_3SiO_{1/2}$ unit and $SiO_{4/2}$ unit; resins comprised of the $(CH_3)_3SiO_{1/2}$ unit, $(CH_2=CH)SiO_{3/2}$ unit, and $SiO_{4/2}$ unit; resins comprised of the $(CH_2=CH)(CH_3)_2SiO_{1/2}$ unit and $SiO_{4/2}$ unit; and resins comprised of the $(CH_2=CH)(CH_3)_2SiO_{1/2}$ unit, $(CH_2=CH)SiO_{3/2}$ unit, and $SiO_{4/2}$ unit. Among these resins, the vinyl-containing resins are preferred because they lead to an improvement in the strength of the silicone rubber coating membrane. The organopolysiloxane resin (B) should be added at 5 to 80 weight parts per 100 weight parts of (A) and preferably at 10 to 80 weight parts per 100 weight parts of (A) in order to achieve the goal of improving the infiltrability into the synthetic fabric while simultaneously improving the thin-film coatability.

The inorganic filler, component (C), may be selected from those fillers known in the silicone rubber art for reinforcement, viscosity adjustment, improving the heat resistance, improving the flame retardancy, and so forth. The inorganic filler (C) may be exemplified by reinforcing fillers such as fumed titanium oxide and microparticulate silicas, for example, fumed silica, precipitated silica, and calcined silica; by nonreinforcing fillers such as quartz powder, diatomaceous earth, iron oxide, aluminum oxide, calcium carbonate, and magnesium carbonate; and by the preceding fillers that have been treated with an organosilicon compound such as organosilane or organopolysiloxane. Among these fillers, the ultramicroparticulate silicas with particle diameter $\geq 50$ millimicrons and specific surface area $\leq 50$ $m^2/g$ are preferred. Surface-treated silica is even more preferred. A surface-treated silica is a silica whose surface has been preliminarily treated with organosilane, organosilazane, or diorganocyclopolysiloxane. The quantity of addition of this component will vary with the type of inorganic filler, but as a general matter will fall within the range of 5 to 100 weight parts per 100 weight parts component (A). When microparticullate silica is used as the inorganic filler, this component should be added within the range of 5 to 15 weight parts per 100 weight parts component (A). The addition of more than 15 weight parts microparticutate silica will make the viscosity of the composition of the instant invention too high and will render solventless coating onto the air bag base fabric essentially impossible. On the other hand, the mechanical strength of the silicone rubber coating membrane falls off at below 5 weight parts of microparticutate silica.

Component (D), an organopolysiloxane that contains at least 2 silicon-bonded hydrogen atoms in each molecule, is a crosslinker for the composition of the instant invention. The organopolysiloxane (D) may be exemplified by trimethylsiloxy-endblocked methylhydrogenpolysiloxanes, trimethylsiloxy-endblocked dimethylsiloxane-methylhydrogensiloxane copolymers, dimethylphenylsiloxy-endblocked methylphenylsiloxane-methylhydrogensiloxane copolymers, cyclic methylhydrogenpolysiloxanes, and copolymers that contain the dimethylhydrogensiloxy unit and $SiO_{4/2}$ unit. The organohydrogenpolysiloxane (D) should be added in a quantity that the ratio between the number of moles of silicon-bonded hydrogen atoms in this organohydrogenpolysiloxane and the number of moles of alkenyl groups in component (A) has a value of 0.6:1 to 20:1.

The platinum group metal catalyst, component (E), used by the instant invention is a curing catalyst for the composition of the instant invention. The platinum group metal catalyst (E) may be exemplified by platinum micropowder, platinum black, chloroplatinic acid, platinum tetrachloride, olefin complexes of chloroplatinic acid, alcohol solutions of chloroplatinic acid, complexes between chloroplatinic acid and alkenylsiloxanes such as a chloroplatinic acid/divinyltetramethyldisiloxane complex, rhodium compounds, and palladium compounds. The platinum group metal catalyst (E) should be added generally at 0.1 to 500 weight parts as platinum group metal per 1,000,000 weight parts component (A), and is preferably used at 1 to 50 weight parts as platinum group metal per 1,000,000 weight parts component (A). The reaction will not develop adequately at less than 0.1 weight parts, while additions in excess of 500 weight parts are uneconomical.

The epoxy-containing organosilicon compound, component (F), functions to improve adherence by the composition of the instant invention for the synthetic fiber fabrics used to make air bags. The epoxy-containing organosilicon compound (F) may be exemplified by epoxy-containing organoalkoxysilanes such as gamma-glycidoxypropyltrimethoxysilane, 3,4-epoxycyclohexylethyltrimethoxysilane, and others; and by epoxy-containing organopolysiloxanes such as epoxy-containing organopolysiloxanes that also contain silicon-bonded vinyl and alkoxy groups, epoxy-containing organopolysiloxanes that also contain silicon-bonded hydrogen, epoxy-containing organopolysiloxanes that also contain silicon-bonded hydrogen and alkoxy, and others. The epoxy-containing organopolysiloxanes may be further exemplified by:

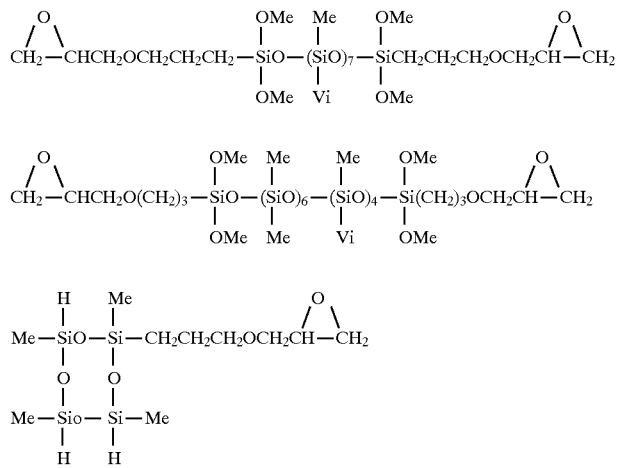

-continued

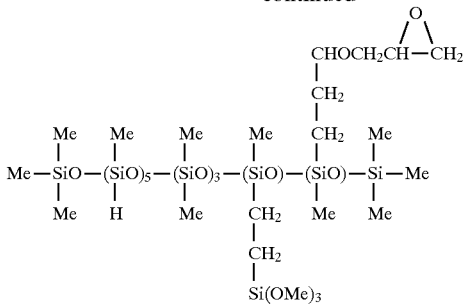

wherein Me represents methyl and Vi represents vinyl,

In addition to the aforementioned components (A) to (F), the composition of the instant invention may also contain a component (G) for use as an inhibitor that may be exemplified by alkyne alcohols such as 3-methyl-1-butyn-3-ol, 3,5-dimethyl-1-hexyn-3-ol, and phenylbutynol; ene-yne compounds such as 3-methyl-3-penten-1-yne and 3,5-dimethyl-3-hexen-1-yne; tetramethyltetrahexenyl-cyclotetrasiloxane; benzotriazole; and others.

The composition of the instant invention can be simply prepared by mixing the aforementioned components (A) to (F) or components (A) to (G) to homogeneity in a mixer such as a kneader mixer, Ross mixer, and so forth. Various additives can be optionally admixed at this point within a range that does not impair the object of the instant invention, for example, pigments, heat stabilizers, and others.

In order to obtain the silicone rubber-coated air bag base fabric, the composition of the instant invention is coated on a synthetic air bag fabric and cured. Useful fabrics may be exemplified by, but not limited to fabrics made of polyamide fibers such as nylon 6, nylon 66, and nylon 46; aramide fiber fabrics; fabrics made of polyester fiber such as polyalkylene terephthalate; polyether-imide fiber fabrics; sulfone fiber fabrics; carbon fiber fabrics, and others. Fabric made of nylon 66 fiber is the most preferred among the preceding synthetic air bag fabrics.

The silicone-rubber-coated air bag base fabric can be prepared by coating the composition of the instant invention as described above on the synthetic air bag fabric and introducing this into a hot-air drying oven for curing.

Application of the composition of the instant invention to synthetic air bag fabrics will provide a silicone rubber coating membrane that is thoroughly infiltrated into the fabric and that is uniformly and evenly coated in the form of a thin film. The coating weight of the silicone rubbber composition will generally be below 80 g/m². Moreover, after thermosetting the flexibility will be excellent, and the silicone rubber coating membrane and synthetic air bag fabric will be firmly bonded into a single body at a bonding strength of at least 1.5 kgf/cm. An air bag base fabric coated with the composition of the instant invention does not suffer from changes at the fold regions during storage of the air bag and does not suffer from delamination of the silicone rubber coating membrane upon challenge by the severe abrasion that occurs when the air bag is activated.

So that those skilled in the art can understand and appreciate the invention taught herein, the following examples are presented, it being understood that these examples should not be used to limit the scope of this invention found in the claims attached hereto.

In the following examples, parts denotes weight parts, the viscosity is the value at 25° C., "Me" denotes the methyl group, and "Vi" denotes the vinyl group.

EXAMPLE 1

The following components were introduced into a Ross mixer: 100 parts dimethylvinylsiloxy-endblocked dimethylpolysiloxane with viscosity OF 2,000 centipoise and 30 parts vinyl-containing methylpolysiloxane resin comprised of the $Vi(Me)_2SiO_{1/2}$ unit and $SiO_{4/2}$ unit (Vi group content= 5.6%, viscosity=230 centipoise). 12 parts fumed silica with specific surface=200 m²/g, 5 parts hexamethyldisilazane as surface treatment agent for the silica, and 2 parts water were then added with mixing to homogeneity. Heat-treatment in vacuo afforded a flowable liquid silicone rubber base.

A liquid silicone rubber coating composition for application to air bags was then prepared by adding to 100 parts of the aforesaid liquid silicone rubber base with mixing to homogeneity: 6 parts methylhydrogenpolysiloxane with the average molecular formula

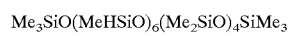

0.5 parts chloroplatinic acid/divinyltetramethyldisiloxane complex (platinum concentration=0.4 weight%), 0.4 parts 3,5-dimethyl-1-hexyn-3-ol (cure inhibitor), and 1 part gamma-glycidoxypropyltrimethoxysilane (adhesion promoter). The resulting composition had a viscosity of 25,000 centipoise. The resulting composition was coated on a nylon 66 fiber fabric (420 denier) and cured by heating for 2 minutes in an oven at 180° C. The silicone rubber coating composition was coated on the air bag fabric using a coater at the minimum amount that afforded an even, uniform coating.

Two coated surfaces of this coated air bag base fabric were overlaid and bonded via a room-temperature-curable silicone rubber adhesive (SE9145 RTV from Toray Dow Corning Silicone Company, Limited). After curing for 7 days at room temperature, a sample with a width of 2.5 cm and a length of 10 cm was cut out and this sample was subjected to peel testing in order to measure the bonding strength. Scott abrasion testing was also carried out using a Scott abrasion tester. After 1,000 rubbing strokes at a pressing force of 2 kgf, the silicone rubber coating thin film was visually inspected for delamination from the fabric surface. Air bag inflation testing was also carried out. In this test, the air bag was instantaneously inflated by injecting hot air (170° C. to 180° C.) into the air bag at a pressure of 7 to 8 kg/cm². A visual inspection was then carried out for the occurrence of delamination of the silicone rubber coating thin film.

The infiltrability was measured as follows. The synthetic air bag fabric was cut into a strip having a width of 2 cm and a length of 10 cm. This strip was hung vertically, and the lower end was immersed by 0.5 mm into the liquid silicone rubber composition. The strip was then allowed to stand in this condition for 24 hours at room temperature, after which the distance was measured by which the liquid silicone rubber composition had infiltrated into the base fabric. A small quantity of pigment was added to the liquid silicone rubber composition in order to facilitate determination of the zone of infiltration by the liquid silicone rubber composition into the base fabric.

The results of the various measurement results reported in Table 1.

COMPARISON EXAMPLE 1

A silicone rubber coating composition was prepared as in Example 1, but in this case adding dimethylvinylsiloxy-endblocked dimethylpolysiloxane with viscosity of 2,000 centipoise in place of the vinyl-containing methylpolysiloxane resin used in Example 1. The properties of this composition were measured as in Example 1, and these results are also reported below in Table 1.

COMPARISON EXAMPLE 2

A silicone rubber coating composition was prepared as in Example 1, but in this case omitting the gamma-glycidoxypropyltrimethoxysilane used in Example 1. The properties of this composition were measured as in Example 1, and these results are also reported below in Table 1.

TABLE 1

| | EXAMPLE | COMPARISON EXAMPLE | |
|---|---|---|---|
| | 1 | 1 | 2 |
| Hardness of the Silicone Rubber (JIS A) | 50 | 34 | 56 |
| Minimum Coating Quantity (g/m₂) | 40 | 100 | 45 |
| Bonding Strength (kgf/cm) | 2.5 | 0.7 | 0.3 |
| Scott Abrasion Test | passes test | delamination of the silicone rubber film | delamination of the silicone rubber film |
| Air Bag Inflation Test | passes test | delamination of the silicone rubber film | delamination of the silicone rubber film |
| Infiltrability (cm) | 2.4 | 0.9 | 1.9 |

EXAMPLE 2

The silicone rubber coating compositions of Example 1, Comparison Example 1, and Comparison Example 2 were respectively coated as in Example 1 on polyester fiber air bag fabric (420 denier). Property measurement was conducted as in Example 1, and the results of these evaluations are reported in Table 2.

TABLE 2

| | EXAMPLE | COMPARISON EXAMPLE | |
|---|---|---|---|
| | Example 2 | 1 | 2 |
| Hardness of the Silicone Rubber (JIS A) | 50 | 34 | 56 |
| Minimum Coating Quantity (g/m₂) | 44 | 109 | 47 |
| Bonding Strength (kgf/cm) | 2.2 | 0.7 | 0.4 |
| Scott Abrasion Test | passes test | delamination of the silicone rubber film | delamination of the silicone rubber film |
| Air Bag Inflation Test | passes test | delamination of the silicone rubber film | delamination of the silicone rubber film |
| Infiltrability (cm) | 2.2 | 0.7 | 1.7 |

EXAMPLE 3

The following components were introduced into a Ross mixer: 100 parts dimethylvinylsiloxy-endblocked dimethylpolysiloxane with viscosity of 12,000 centipoise and 20 parts vinyl-containing methylpolysiloxane resin composed of the $Vi(Me)_2SiO_{1/2}$ unit and $SiO_{4/2}$ unit (Vi weight=5.6%, viscosity=230 centipoise). A flowable liquid silicone rubber base was then prepared by the introduction with mixing to homogeneity of 10 parts fumed silica with specific surface= 200 m²/g that had been preliminarily treated with hexamethyldisilazane.

The following were then added to 100 parts of the aforesaid liquid silicone rubber base with mixing to homogeneity: 3 parts methylhydrogenpolysiloxane (silicon-bonded hydrogen content=1.57 weight%) with the average molecular formula

$Me_3SiO(MeHSiO)_{25}SiMe_3$ 0.5 parts chloroplatinic acid/divinyltetramethyldisiloxane complex (platinum concentration=0.4 weight%), 0.1 part methyltris(3-methyl-1-butyn-3-oxy)silane (cure inhibitor), and 1 part of the following organosilicon compound (adhesion promoter).

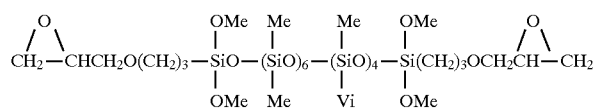

wherein Me represents methyl and Vi represents vinyl.

The resulting liquid silicone rubber composition had a viscosity of 50,000 centipoise. The resulting composition was coated on a nylon 66 fiber fabric as in Example 1, and the bondability and thin-film coatability were evaluated also as in Example 1. The results of the evaluations are reported in Table 3.

COMPARISON EXAMPLE 3

A silicone rubber coating composition was prepared as in Example 3, but using dimethylvinylsiloxy-endblocked dimethylpolysiloxane with viscosity of 12,000 centipoise in place of the vinyl-containing methylpolysiloxane resin used in the silicone rubber coating composition of Example 3. The results of the evaluations are reported in Table 3.

COMPARISON EXAMPLE 4

A silicone rubber coating composition was prepared as in Example 3, but in this case omitting the adhesion promoter used in the silicone rubber coating composition of Example 3.

The results of the evaluations are reported in Table 3.

TABLE 3

| | PRESENT INVENTION | COMPARISON EXAMPLES | |
|---|---|---|---|
| | Example 3 | 3 | 4 |
| Hardness of the Silicone Rubber (JIS A) | 44 | 30 | 51 |
| Minimum Coating Quantity (g/m$_2$) | 45 | 120 | 48 |
| Bonding Strength (kgf/cm) | 2.2 | 0.9 | 0.4 |
| Scott Abrasion Test | passes test | delamination of the silicone rubber film | delamination of the silicone rubber film |
| Air Bag Inflation Test | passes test | delamination of the silicone rubber film | delamination of the silicone rubber film |
| Infiltrability (cm) | 1.8 | 0.6 | 1.4 |

Because the instant invention's liquid silicone rubber coating composition for air bags is composed of components (A) to (F) and in particular because it contains the organosiloxane resin of component (B) and the epoxy-containing organosilicon compound of component (F), it exhibits an excellent infiltrability and bonding strength for the synthetic fiber fabrics used to make air bags. Moreover, it is very coatable into thin films even without the use of a diluting solvent. Air bag base fabrics prepared by the application of the liquid silicone rubber coating composition of the instant invention are very flexible. Finally, the silicone rubber coating membrane is neither delaminated nor scorched by the severe abrasion that occurs between coated surfaces during inflation by the hot gas produced by the inflator.

What is claimed is:

1. A liquid silicone rubber coating composition for application to air bags consisting essentially of
    (A) a diorganopolysiloxane having at least 2 alkenyl groups in each molecule,
    (B) 5 to 80 weight parts per 100 weight parts of (A) of an organopolysiloxane resin,
    (C) 5 to 100 weight parts per 100 weight parts of (A) of an inorganic filler,
    (D) an organohydrogenpolysiloxane having at least 2 silicon-bonded hydrogen atoms in each molecule, in a quantity sufficient for the ratio between the number of moles of silicon-bonded hydrogen atoms in the organohydrogenpolysiloxane and the number of moles of alkenyl groups in component (A) to have a value of 0.6:1 to 20:1,
    (E) a platinum group metal catalyst in a quantity providing 0.1 to 500 weight parts as platinum group metal per 1,000,000 weight parts component (A), and
    (F) 0.1 to 20 weight parts per 100 weight parts of (A) of an epoxy group-containing organosilicon compound.

2. A liquid silicone rubber coating composition as claimed in claim 1 where the diorganopolysiloxane component (A) has a viscosity of 1,000 to 100,000 centipoise at 25° C.

3. A liquid silicone rubber coating composition as claimed in claim 1 where the organopolysiloxane resin component (B) is a vinyl-containing organopolysiloxane resin.

4. A liquid silicone rubber coating composition as claimed in claim 1 where the inorganic filler component (C) is microparticulate silica.

5. A liquid silicone rubber coating composition as claimed in claim 4 where the microparticulate silica is added at 5 to 15 weight parts per 100 weight parts component (A).

6. A liquid silicone rubber coating composition as claimed in claim 1 wherein the platinum group metal catalyst component (E) is a chloroplatinic acid/divinyltetramethyldisiloxane complex.

7. A liquid silicone rubber coating composition as claimed in claim 1 where the epoxy-containing organosilicon compound component (F) is an organosilicon compound that contains silicon-bonded alkoxy.

8. A liquid silicone rubber coating composition as claimed in claim 7 which has a bonding strength of at least 1.5 kgf/cm after curing in a film on a synthetic fiber fabric.

9. A liquid silicone rubber coating composition as claimed in claim 1 which additionally contains (G) a compound selected from the group consisting of alkyne alcohols, enezyne compounds, tetramethyltetrahexenylcyclotetrasiloxane, and benzotriazole.

* * * * *